US010572366B1

(12) United States Patent
Raju et al.

(10) Patent No.: US 10,572,366 B1
(45) Date of Patent: Feb. 25, 2020

(54) HARDWARE INVENTORY SYSTEM

(71) Applicant: AMERICAN MEGATRENDS INTERNATIONAL, LLC, Norcross, GA (US)

(72) Inventors: Ramesh Raju, Chennai (IN); Gowtham Shanmukham, Coimbatore (IN)

(73) Assignee: American Megatrends International, LLC, Norcross, GA (US)

( * ) Notice: Subject to any disclaimer, the term of this patent is extended or adjusted under 35 U.S.C. 154(b) by 0 days.

(21) Appl. No.: 15/697,850

(22) Filed: Sep. 7, 2017

(51) Int. Cl.
*G06F 9/44* (2018.01)
*G06F 11/34* (2006.01)
*G06F 9/4401* (2018.01)
*G06F 11/30* (2006.01)
*G06F 11/14* (2006.01)

(52) U.S. Cl.
CPC ........ *G06F 11/3495* (2013.01); *G06F 9/4411* (2013.01); *G06F 11/1417* (2013.01); *G06F 11/3058* (2013.01)

(58) Field of Classification Search
None
See application file for complete search history.

(56) References Cited

U.S. PATENT DOCUMENTS

| | | | | |
|---|---|---|---|---|
| 6,381,636 B1* | 4/2002 | Cromer | ................. | G06F 1/3209 709/208 |
| 7,073,050 B2* | 7/2006 | Chen | .................... | G06Q 10/087 707/999.003 |
| 2002/0032763 A1* | 3/2002 | Cox | .................... | H04L 67/1095 709/223 |
| 2005/0071442 A1* | 3/2005 | Becker | ................. | G06F 9/4401 709/220 |
| 2006/0080522 A1* | 4/2006 | Button | ................. | G06F 9/4403 713/2 |
| 2006/0248328 A1* | 11/2006 | Iszlai | .................... | G06F 9/4416 713/2 |
| 2007/0168919 A1* | 7/2007 | Henseler | ................... | G06F 8/61 717/101 |
| 2009/0193210 A1* | 7/2009 | Hewett | ................. | G06F 16/174 711/163 |
| 2013/0013759 A1* | 1/2013 | Austen | ............. | H04L 29/08099 709/223 |
| 2015/0178095 A1* | 6/2015 | Balakrishnan | ........ | G06F 13/364 710/110 |
| 2017/0264493 A1* | 9/2017 | Cencini | ................. | H04L 41/044 |

* cited by examiner

*Primary Examiner* — Danny Chan
(74) *Attorney, Agent, or Firm* — Newport IP, LLC;Shigeta | Hope

(57) ABSTRACT

A system hardware report is generated during a restart of a user device. In some examples, prior to handing over the user device to an operating system, a collection module is invoked. The collection module collects information determined during the BIOS operation. The collected information can include information about various aspects of the user device, such as the type of CPU, memory type and size, input/output devices, and the like.

15 Claims, 5 Drawing Sheets

HARDWARE INVENTORY SYSTEM

BACKGROUND

Computer manufacturers and some retailers typically have a sophisticated and extensive inventory system that tracks the components installed in their computer systems. These inventory systems usually maintain records relating to hardware installed on their computer systems. These inventory systems are for inventory control as well as quality control. For example, the number of processors installed can be used to track inventory levels for ordering additional processors. In another example, the type of memory and number of memory units can be tracked to ensure that the right number and type of memory units are being installed.

These systems are often very accurate up until the point of consumer purchase. Typically, once a consumer purchases a device, the information stream of installed components diminishes, and may be extinguished altogether. That means that if a consumer changes a particular configuration, such as installing (upgrading) memory, the manufacturer or retailer may not receive that information.

Current operating systems typically provide little to no updating of component configurations outside of the system. The software installed on the computer system may provide updates on software installations to the software developers (or owners of the software). However, these updates on configurations for a particular computer system are usually limited in scope and limited in distribution.

It is with respect to these and other considerations that the various configurations described below are presented.

SUMMARY

Technologies are disclosed herein for a hardware inventory system. In some examples, a BIOS collection module analyzes compiled system data during a boot process. Using the information determined during the analysis, the collection module creates a system hardware report. In some examples, the system hardware report can be transmitted to a central service that generates reports based on the information received from the collection module. In some examples, the system hardware report is transmitted to the central service using Internet of things ("IoT") technology.

In some examples, when implemented in a computer system that follows the Intelligent Platform Management Interface ("IMPI") specification, information for the system hardware report can also be obtained from a baseboard management controller ("BMC"). Different types of sensors built into a computer system report to the BMC on parameters such as temperature, cooling fan speeds, power status, operating system (OS) status, and the like. The system hardware report can be augmented with information received from the BMC.

The subject matter described herein can also be implemented in a computing system, as an apparatus, or as an article of manufacture such as a computer-readable storage medium. These and various other features as well as advantages will be apparent from a reading of the following detailed description and a review of the associated drawings.

DETAILED DESCRIPTION

Technologies are disclosed herein for a hardware inventory system. In some examples, the BIOS is modified to include a collection module. While booting to an operating system, the BIOS initiates the collection module to collect BIOS-related information. Some of the BIOS-related information includes, but is not limited to, system/architecture type, system manufacture information, processor information, memory information, BIOS information, system security information, system build date, input/output device information, secure BIOS policy, and system security.

Although not limited to any particular benefit, using information collected during the BIOS boot process can automate predictive analytics, give user in-depth details of system hardware, and address potential security risks systems can encounter in the future. For example, users can be made aware of a security risk for certain hardware configurations. Without information collected during the BIOS boot process, manufacturers or other users may not be aware that systems previously sold (and potentially reconfigured) are susceptible to the security risk. In another example, a manufacturer may analyze the information collected during the BIOS boot process and determine that a significant number of end users have modified their memory in a certain way, indicating a potential limitation of the systems when sold. A manufacturer may use this information to change new systems, through the use of system updates, based on the collected information. These and other technical improvements may be provided using various aspects of the presently disclosed subject matter.

While the technical details are presented herein in the general context of program modules that execute in conjunction with the execution of a runtime environment and a computer firmware, those skilled in the art will recognize that the configurations can also be implemented in combination with other program modules. Generally, program modules include routines, programs, components, data structures, and other types of structures that perform particular tasks or implement particular abstract data types.

Moreover, those skilled in the art will appreciate that the configurations described herein can be practiced with other computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

Figure 1:
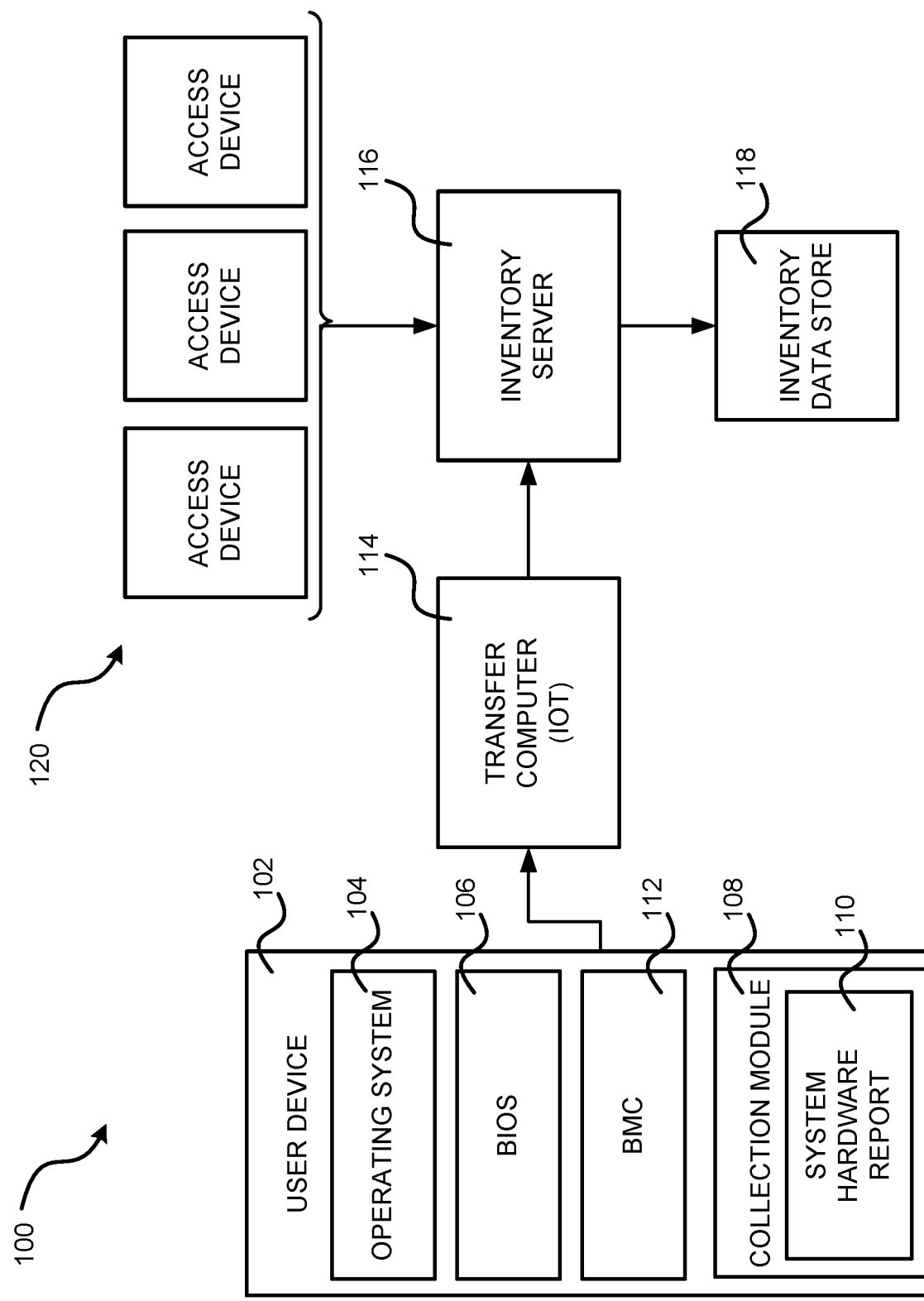
FIG. 1 shows an example computing system configured to provide a hardware inventory system.

FIG. 1 is an example system 100 for a hardware inventory system. The system includes a user device 102. The user device 102 can be a computer, laptop, cellular device, or other computing platform used by a user. The user device 102 can also be one of other user devices in a networked configuration. The presently disclosed subject matter is not limited to any particular type or configuration of the user device.

The user device 102 includes a BIOS 106. In some configurations, the BIOS 106 is a series of instructions that initializes hardware, performing a Power-On-Self-Test ("POST") process. In some examples, the POST process verifies the integrity of the firmware, finds and initializes system memory, and identifies and organizes devices available for booting.

The user device 102 further includes a collection module 108. In some examples, the collection module 108 is a series of instructions implemented by the BIOS 106 that collects information determined during the boot process. The collection module 108 stores the information as a system hardware report 110.

During a boot process, the BIOS 106 is initialized. Along with other functions, the BIOS 106 performs a POST process. During the POST process, the BIOS may verify CPU registers, verify the integrity of the BIOS code itself, verify some basic components like DMA, timer, interrupt controller, find, size, and verify system main memory, identify, organize, and select which devices are available for booting, and discover, initialize, and catalog all system buses and devices.

As shown above, information about the user device 102 generated during a POST process can be extensive. For example, information about the CPU registers, input/output devices, memory, and the like is generated. In some examples, once the POST process is completed, prior to invoking bootstrap loader code to load the operating system 104, the BIOS 106 executes a collection module 108. The BIOS 106 can be configured with instructions for invoking the collection module 108 after the POST process is performed, but before the bootstrap loader code is invoked.

The collection module 108 can be implemented before the operating system 104 is loaded for various reasons. For examples, once the operation of the user device 102 is handed over to the operating system 104, the operating system 104 may have one or more security protocols that prevent the transmission of information outside of the user device 102. In other examples, the operating system 104 may be misconfigured or have inaccurate hardware information that conflicts with the information collected prior to handing over the user device 102 to the operating system 104. In these examples, erroneous information may be transmitted.

In some examples, the information collected prior to handing over the user device 102 to the operating system 104 can be more accurate than information that may be available while the operating system 104 is executing. Settings for the BIOS 106, and its associated instructions, are typically difficult to modify to the degree that inaccurate information is generated, whereas settings for the operating system 104 can sometimes be modified to the point that erroneous information is transmitted. Therefore, in some examples, the information collected prior to handing over the user device 102 to the operating system 104 can be more accurate and more secure than information collected while the operating system 104 has control of the user device 102.

The collection module 108 collects the information collected prior to handing over the user device 102 to the operating system 104 as a system hardware report 110. The system hardware report 110 can be stored in various formats. For example, the system hardware report 110 can be stored as a table, such as example Table 1, below:

TABLE 1

System Hardware Report -
MAC Address: d8-cx-8x-cx-a6-1x-00-00

| Date Collected | Processor Type | Memory Information | Architecture Type |
|---|---|---|---|
| Jan. 1, 2017 | CPU @ 3.3 GHz | 9182 MB | x64 |
| Jan. 4, 2017 | CPU @ 3.3 GHz | 9182 MB | x64 |
| Jan. 8, 2017 | CPU @ 3.3 GHz | 9982 MB | x64 |
| Jan. 10, 2017 | CPU @ 3.3 GHz | 9982 MB | x64 |

In Table 1, the collected information includes the date the information collected, the processor type, memory information, and the architecture type. It should be understood that the information shown in Table 1 is merely an example of the types of information that can be collected and provided in the system hardware report 110.

Table 1 indicates that information was collected on 4 different dates. In some examples, the information is collected when the user device 102 is reset and the BIOS 106 is invoked. Thus, as the user device 102 is reset further, the information in Table 1 will be augmented with the information collected in subsequent resets.

Shown in Table 1 is that the memory information changed between the reset that occurred on 1-4-2017 and the reset that occurred on 1-8-2017. This may indicate that additional memory was added to the user device 102. Also shown in Table 1 is the MAC Address for the user device 102. The MAC Address can be used by a receiving entity to uniquely identify the user device 102. It should be understood, however, that the MAC Address may not be used in all examples, as other identifying information may be used. In some examples, the system hardware report 110 may not include identifying information.

In some examples, the user device 102 can be a server that includes a baseboard management controller ("BMC") 112. The BMC 112 resides on each server blade of the user device 102. In some examples, the BMC 112 is a specialized service processor that monitors the physical state of the user device 102, network server or other hardware device using sensors and communicating with the system administrator through an independent connection. During use, the BMC 112 also generates information that can be collected as part of the system hardware report 110. In some examples, the system hardware report 110 is comprised of information from the BMC 112. In other examples, the system hardware report 110 is comprised of information from the BIOS 106. The presently disclosed subject matter is not limited to any particular source of information.

Once generated, the collection module 108 causes the system hardware report 110 to be transmitted to a transfer computer 114. In some examples, the transfer computer 114 is a computer designed to collect system hardware reports, such as the system hardware report 110, and transmit the system hardware reports to an inventory server 116. The inventory server 116 collects the system hardware reports and stores the system hardware reports in an inventory data store 118.

The inventory server 116 acts as a central collection facility to collect the various system hardware reports and provide the reports to one or more access devices 120. The access devices 120 can be systems operated by entities that have been granted access to a portion of, or all of, the information stored in the inventory data store 118. An example of an access device 120 can be a device used by a manufacturer of the user device 102. The manufacturer can access the information stored in the inventory data store 118 to monitor information collected about the user device 102, as well as other user devices sold or manufactured by the manufacturer.

The use of a transfer computer 114 may be needed because the user device 102 may not be configured to communicate with the inventory server 116. It should be understood, however, that the user device 102 may be configured to communicate directly with the inventory server 116. For example, the inventory server 116 may be configured to communicate as part of an Internet of Things network. If the user device 102 does not have the capability to transmit information over a IoT network, the transfer computer 114 can be used to provide the necessary interface between the user device 102 and the inventory server 116. However, as noted above, the user device 102 may be capable of communicating with the inventory server 116. Thus, in these examples, the functionality of the transfer computer 114 may be performed by the user device 102.

In some examples, the data in the system hardware report 110 is transmitted using JavaScript Object Notation ("JSON") format. JSON is an open-standard format that uses human-readable text to transmit data objects consisting of attribute-value pairs. The presently disclosed subject matter is not limited to the use of JSON, as other formats may be used, including XML and YAML Ain't Markup Language ("YAML").

Figure 2:
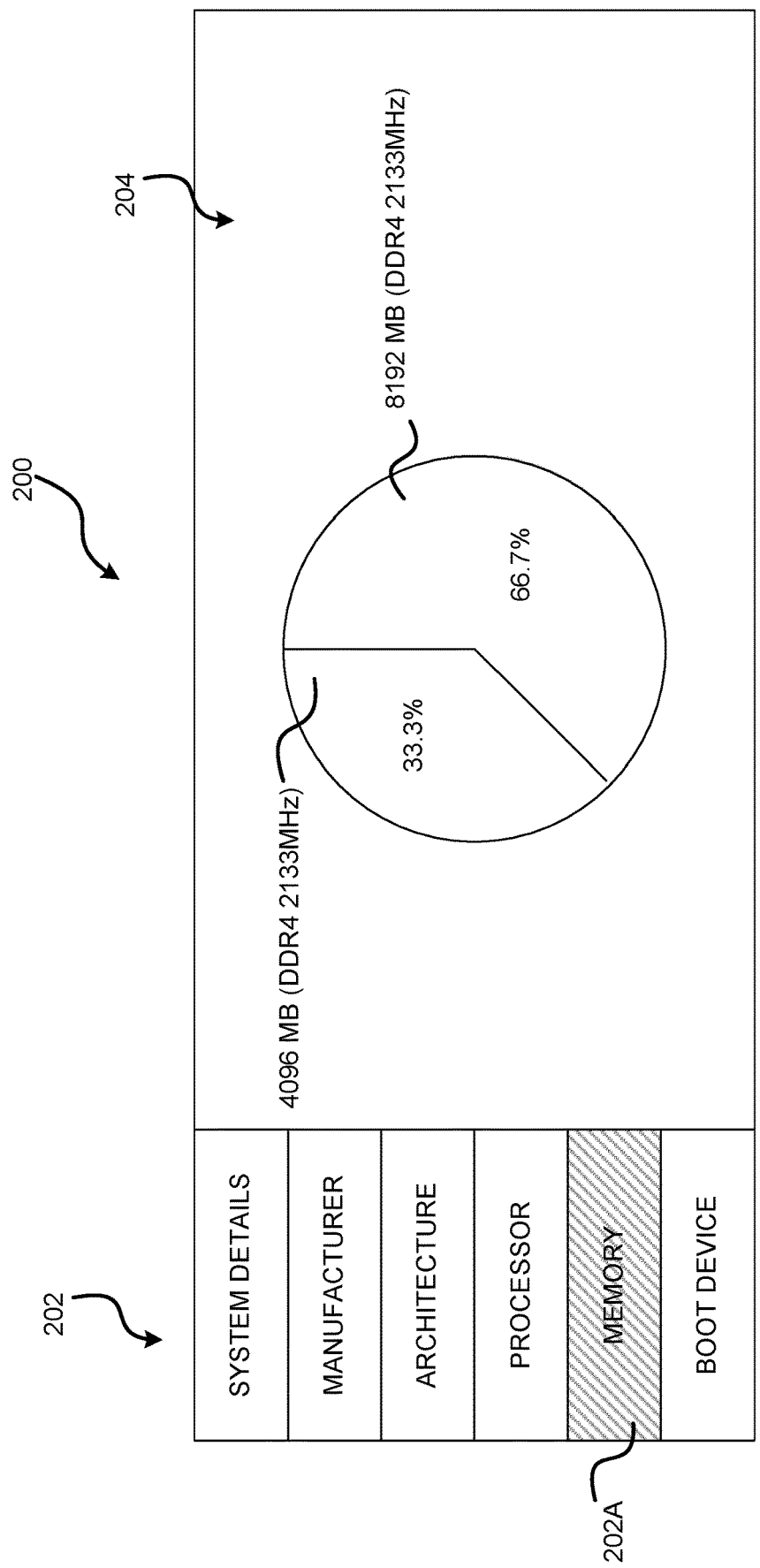
FIG. 2 is an example user interface to access system hardware reports.

FIG. 2 is an example report user interface 200 to access information stored in the inventory data store 118. The user interface 200 may be executed on the access devices 120. The user interface 200 includes a data selection section 202 and a data presentation section 204. The data selection section 202 includes several selectable units that, when selected, present collected data in the data presentation section 204.

For example, in FIG. 2, the memory unit 202A of the data selection section 202 is indicated as being selected. The data presented in the data presentation section 204 shows the percentage of devices that have 4096 MB of DDR4 2133 MHz memory and 8192 MB of DDR4 2133 MHz memory. The data presented in the data presentation section 204 is information collected from one or more system hardware reports, such as the system hardware report 110.

Figure 3:
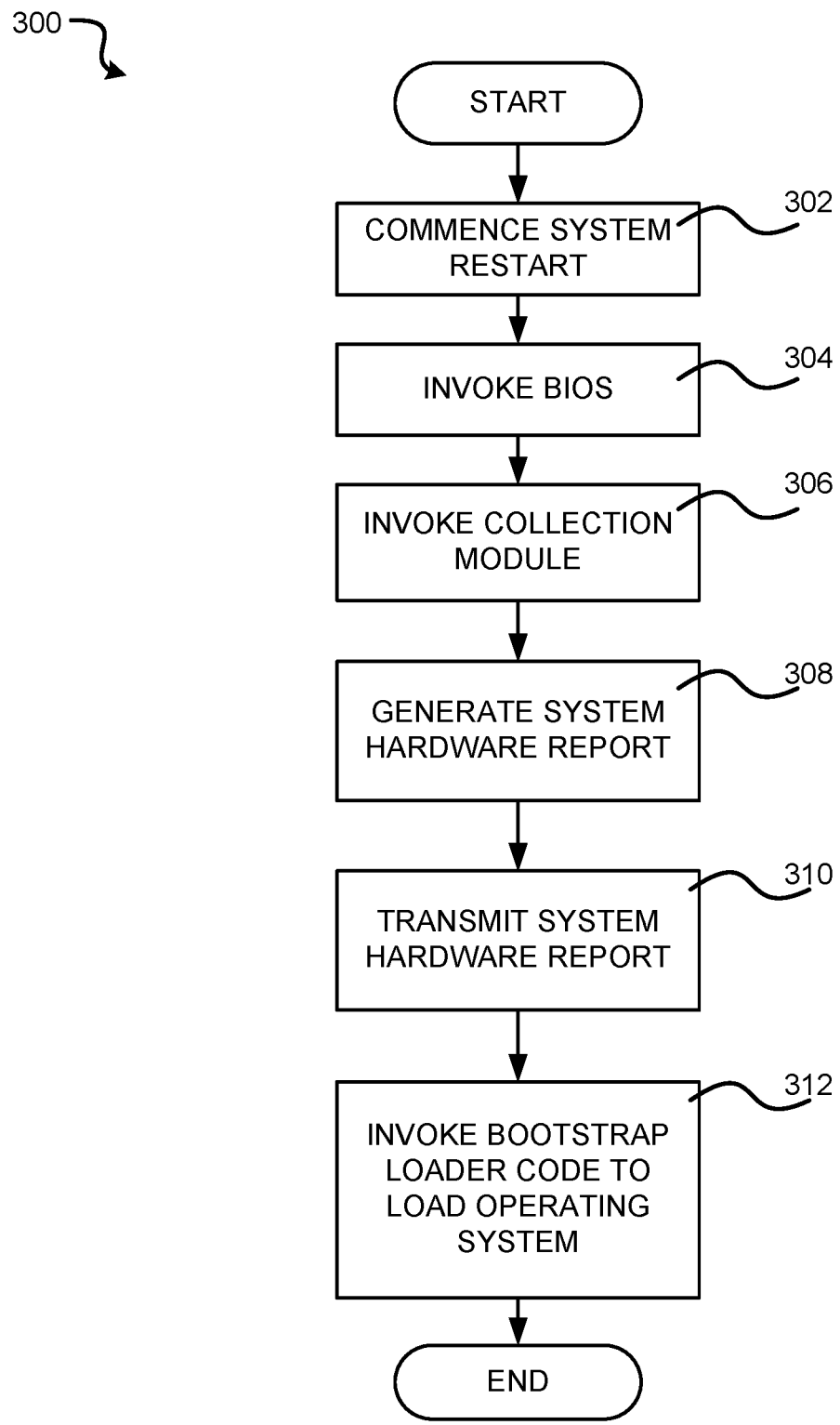
FIG. 3 is a flow diagram showing one illustrative process performed by a computer to generate a system hardware report.

FIG. 3 is a flow diagram showing one illustrative routine 300 performed by the system 100 to generate the system hardware report 110. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the configurations described herein are implemented. Accordingly, the logical operations making up the implementations described herein are referred to variously as operations, structural devices, acts or modules. It will be recognized by one skilled in the art that these operations, structural devices, acts and modules can be implemented in software, in firmware, in special purpose digital logic, and any combination thereof without deviating from the spirit and scope of the present disclosed subject matter as recited within the claims attached hereto.

The routine 300 begins at operation 302, where a restart is commenced on the user device 102. It should be noted that the presently disclosed subject matter is not limited to any particular type of reset, as various forms of a reset may be used to generate the system hardware report 110. For example, a cold restart, whereby power is removed from the system, and/or a warm reset may invoke the routine 300. The routine 300 continues to operation 304, where the BIOS is invoked.

The routine 300 continues to operation 306, where the collection module 108 is invoked. In some examples, such as the routine 300, the collection module 108 is invoked prior to loading the operating system 104. It should be understood, however, that the collection module 108 may be invoked at other operations of the BIOS 106. For example, the collection module 108 may be invoked when the BIOS performs a check on a particular device. For example, the collection module 108 can be invoked after the BIOS determines the CPU from which to collect CPU information as well as the memory to collect memory information. In these examples, the collection module 108 may collect information as it is determined by the BIOS rather than collecting information at the end.

The routine 300 continues to operation 308, where the system hardware report 110 is generated. The system hardware report 110 can be in various formats, such as in tabular form. The system hardware report 110 can also include information about the particular user device 102 to associate the user device 102 with the information in the system hardware report. For example, the MAC Address for the user device 102 can be used to associate the user device 102 with the information in the system hardware report 110. In some examples, the information is collected anonymously whereby no device is associated with the information in the system hardware report 110.

The routine 300 continues to operation 310, where the system hardware report 110 is transmitted. The system hardware report 110 can be transmitted using various formats, such as JSON, to an inventory server 116 that collects and stores the information. In some examples, a transfer computer 114 can be used to facilitate the communication between the user device 102 and the inventory server 116.

The routine 300 continues to operation 312, where the bootstrap loader is invoked to load the operating system 104. The routine 300 thereafter ends.

Figure 4:
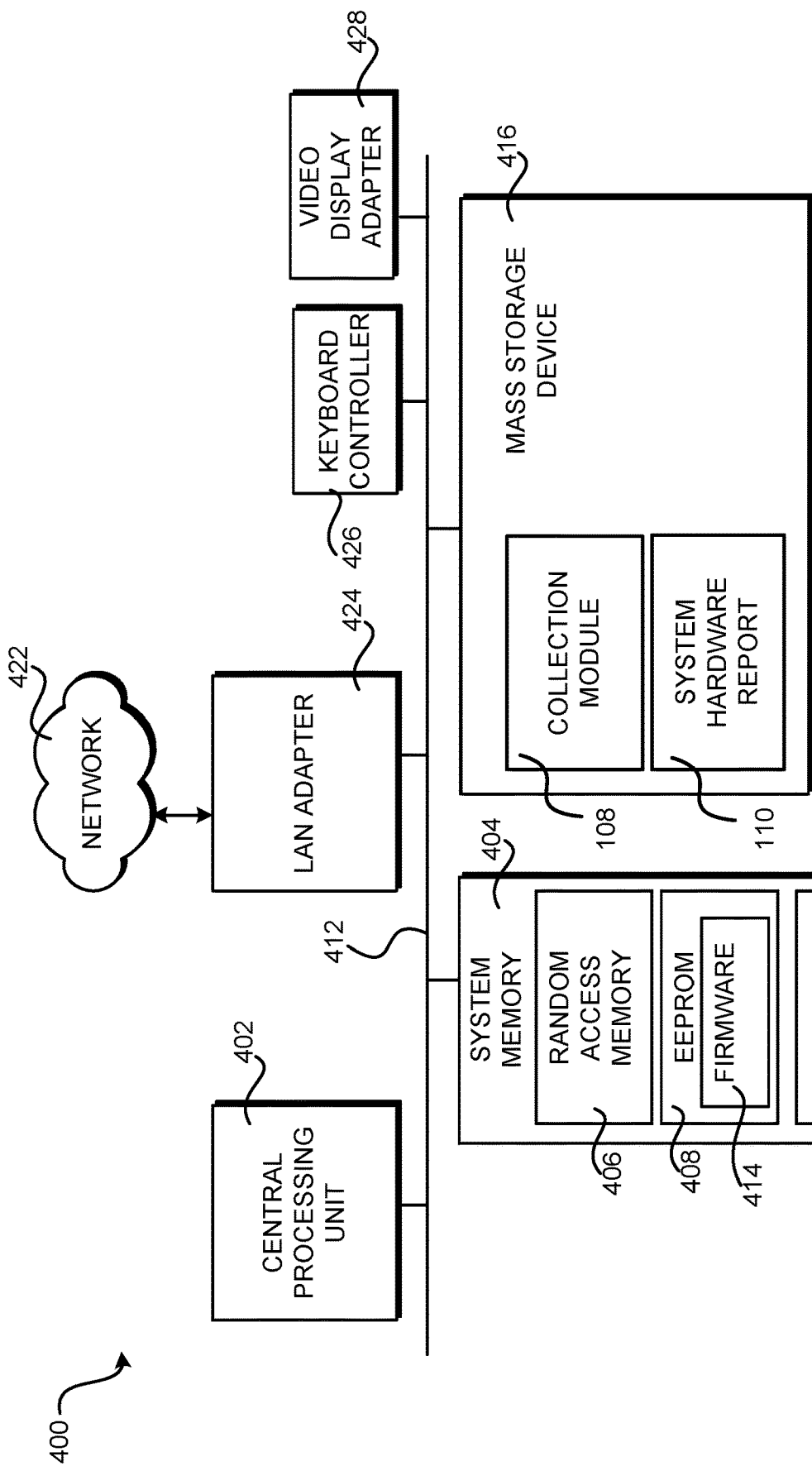
FIGS. 4 and 5 are software architecture diagrams that illustrate aspects of a firmware environment utilized by examples described herein, according to an example.

FIG. 4 and the following discussion are intended to provide a brief, general description of a suitable computing environment 400 in which the configurations described herein can be implemented. The computer architecture shown in FIG. 4 illustrates a conventional computer, including a CPU 402, a system memory 404, including a RAM 406, an EEPROM 408, a CMOS memory 410, and a system bus 412 that couples the system memory 404 to the CPU 402. According to example of the disclosed subject matter, the CPU 402 may comprise a general purpose microprocessor from INTEL CORPORATION.

The EEPROM 408 can store firmware 414 for use in operating the system environment 400 or an extensible firmware interface ("EFI"), containing the basic routines that help to transfer information between elements within the computer, such as during startup. The CMOS memory 410 is a battery-backed memory device that is used by the firmware 414 to store setting information for the system environment 400. Additional details regarding the architecture and operation of the firmware 414 will be provided below.

The system environment 400 further includes a mass storage device 416 for storing the collection module 108 and system hardware report 110, and other program modules. In some examples, the collection module 108 can be stored as part of the firmware 414. The mass storage device 416 is connected to the CPU 402 through a mass storage controller (not shown) connected to the system bus 412. The mass storage device 416 and its associated computer-readable media, provide non-volatile storage for the system environment 400. Although the description of computer-readable media contained herein refers to a mass storage device, such as a hard disk or CD-ROM drive, it should be appreciated by those skilled in the art that computer-readable media can be any available media that can be accessed by the system environment 400.

By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system environment 400. Computer storage media does not include carrier waves or non-transitory signals.

According to various configurations of the disclosed subject matter, the system environment 400 can operate in a networked environment using logical connections to remote computers through a network 422, such as the Internet. The system environment 400 can connect to the network 422 through a local area network ("LAN") adapter 424 connected to the system bus 412. It should be appreciated that the LAN adapter 424 can also be utilized to connect to other types of networks and remote computer systems. The system environment 400 can also include a keyboard controller 426 for receiving input from a keyboard and a video display adapter 428 for providing output to a display screen.

Figure 5:
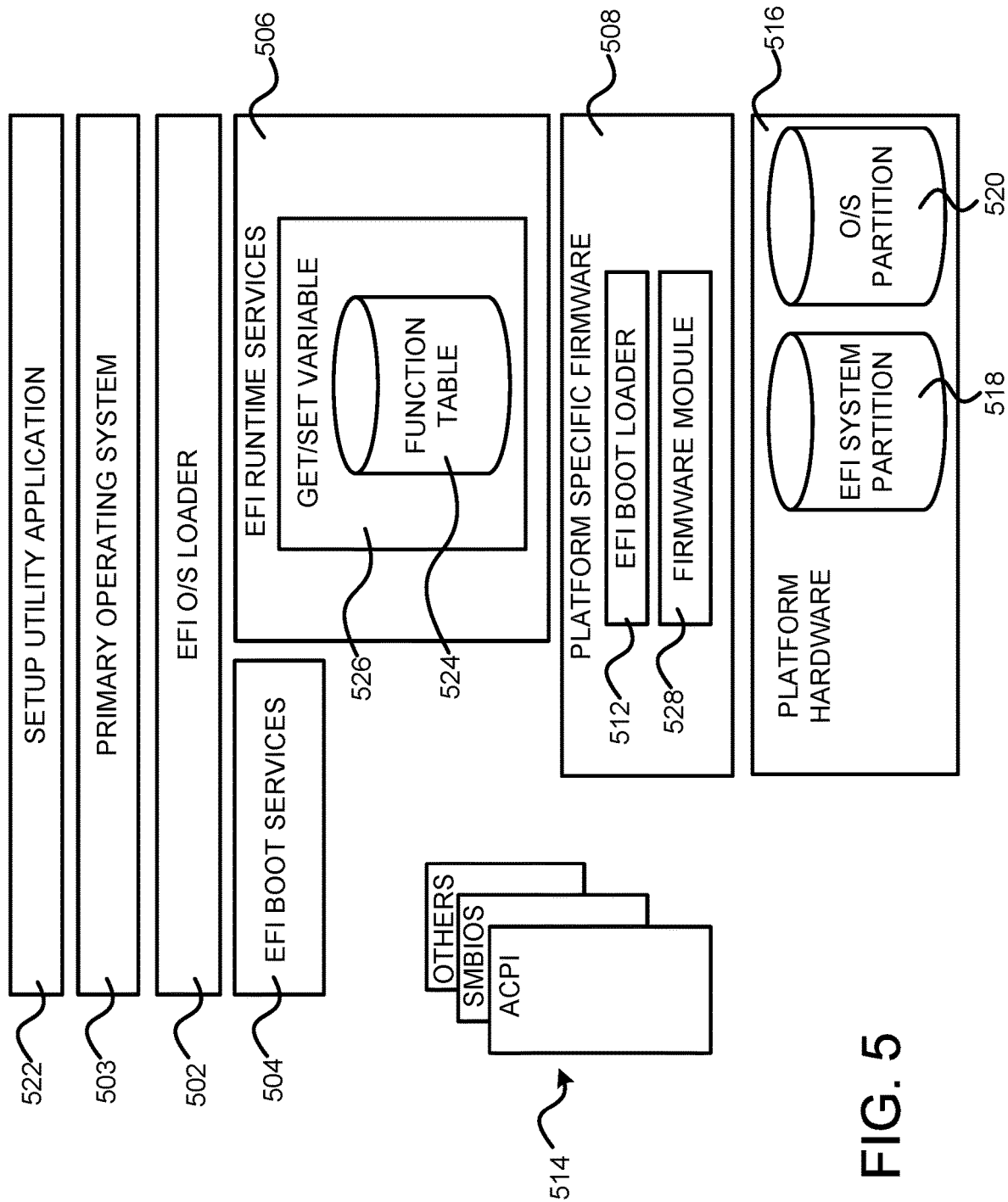

Turning now to FIG. 5, additional details regarding an EFI specification-compliant system utilized to provide an operating environment for the various implementations presented herein will be described. As shown in FIG. 5, the system includes platform hardware 516 and platform specific firmware 508. The platform specific firmware 508 can retrieve an O/S image from the EFI system partition 518 using an EFI O/S loader 502. The EFI system partition 518 can be an architecturally shareable system partition. As such, the EFI system partition 518 defines a partition and file system that are designed to allow safe sharing of mass storage between multiple vendors. An O/S partition 520 can also be utilized.

Once started, the EFI O/S loader 502 continues to boot a primary operating system 503. In doing so, the EFI O/S loader 502 can use UEFI boot services 504 to interface to other supported specifications to survey, comprehend, and initialize the various platform components and the operating system software that manages them. Thus, interfaces 514 defined by other specifications can also be present on the system. For example, ACPI and the System Management BIOS ("SMBIOS") specifications can be supported, among other interfaces.

UEFI boot services 504 can provide interfaces for devices and system functionality used during boot time. UEFI runtime services 506 can also be available to the UEFI boot loader 512 during the boot phase. For example, a set of runtime services can be presented to ensure appropriate abstraction of base platform hardware resources used by an operating system during its operation. UEFI allows extension of platform firmware by loading UEFI driver and UEFI application images which, when loaded, have access to UEFI-defined runtime and boot services. Various program modules can provide the boot-time and run-time services. The UEFI runtime services 506 can include a function table 524, which is a table of functions and associated pointers relating to functions associated with program modules, such as device drivers. The UEFI runtime services 506 can also include variable services 526 that get, set, and query variables. A firmware module 528 can include a collection of software routines and functions that communicate directly with hardware.

Based on the foregoing, it should be appreciated that technologies have been described herein for a hardware inventory system. Moreover, although the configurations described herein have been described in language specific to computer structural features, methodological acts and by computer readable media, it is to be understood that the disclosed subject matter defined in the appended claims is not necessarily limited to the specific structures, acts or media described. Therefore, the specific structural features, acts and mediums are disclosed as exemplary configurations implementing the claimed disclosed subject matter.

The various configurations described above are provided by way of illustration only and should not be construed to limit the disclosed subject matter. Those skilled in the art will readily recognize various modifications and changes that can be made to the presently disclosed subject matter without following the example configurations and applications illustrated and described herein, and without departing from the true spirit and scope of the invention, which is set forth in the following claims.

What is claimed is:

1. A computer-implemented method, comprising:
commencing a system restart;
invoking a BIOS boot process that is performed by a BIOS;
invoking, by the BIOS, prior to loading an operating system, a collection module included in the BIOS to analyze compiled system data during the BIOS boot process;
generating, by the collection module, a system hardware report comprising data received from the collection module;
transmitting the system hardware report to a transfer computer to send the system hardware report to an inventory server that collects a plurality of system hardware reports collected from a plurality of systems during respective BIOS boot processes, the collection module causing the transmitting;
receiving a system update based on the plurality of system hardware reports; and
invoking a bootstrap loader to load the operating system.

2. The computer-implemented method of claim 1, wherein the inventory server generates reports based on information received from the collection module.

3. The computer-implemented method of claim 1, wherein the system hardware report further comprises information received from a baseboard management controller.

4. The computer-implemented method of claim 3, wherein the information received from the baseboard management controller comprises a temperature, a cooling fan speed, a power status, and an operating system status.

5. The computer-implemented method of claim 1, wherein the system hardware report is transmitted using a JSON format, an XML format, or a YAML format.

6. The computer-implemented method of claim 1, further comprising providing a user interface to access information stored in an inventory data store, wherein the inventory data store comprises data from the plurality of system hardware reports.

7. A non-transitory computer-readable storage medium having stored thereon computer-executable instructions which, when executed by one or more processors, cause a computer to:
commence a system restart;
invoke a BIOS boot process that is performed by a BIOS;
invoke, by the BIOS, prior to loading an operating system, a collection module included in the BIOS to analyze compiled system data during the BIOS boot process;
generate a system hardware report comprising data received from the collection module;
transmit the system hardware report to a transfer computer to send the system hardware report to an inventory server that collects a plurality of system hardware reports collected from a plurality of other computers during respective BIOS boot processes;
receive a system update based on the plurality of system hardware reports; and
invoke a bootstrap loader to load the operating system.

8. The non-transitory computer-readable storage medium of claim 7, wherein the inventory server generates reports based on information received from the collection module.

9. The non-transitory computer-readable storage medium of claim 7, wherein the system hardware report further comprises information received from a baseboard management controller.

10. The non-transitory computer-readable storage medium of claim 9, wherein the information received from the baseboard management controller comprises a temperature, a cooling fan speed, a power status, and an operating system status.

11. The non-transitory computer-readable storage medium of claim 7, wherein the system hardware report is transmitted using a JSON format, an XML format, or a YAML format.

12. The non-transitory computer-readable storage medium of claim 7, further comprising computer-executable instructions to provide a user interface to access information stored in an inventory data store, wherein the inventory data store comprises data from the plurality of system hardware reports.

13. A system, comprising:
a central processing unit (CPU) configured to provide a system management mode (SMM); and
a memory device in communication with the CPU, the memory device having computer-executable instructions stored therein, which when executed by the CPU,
commence a system restart,
invoke a BIOS boot process that is performed by a BIOS,
invoke, by the BIOS, prior to loading an operating system, a collection module included in the BIOS to analyze compiled system data during the BIOS boot process,
generate a system hardware report comprising data received from the collection module,
transmit the system hardware report to a transfer computer to send the system hardware report to an inventory server that collects a plurality of system hardware reports collected from a plurality of systems during respective BIOS boot processes,
receive a system update based on the plurality of system hardware reports; and
invoke a bootstrap loader to load the operating system.

14. The system of claim 13, wherein the system hardware report further comprises information received from a baseboard management controller, wherein the information received from the baseboard management controller comprises a temperature, a cooling fan speed, a power status, and an operating system status.

15. The system of claim 13, further comprising computer-executable instructions to provide a user interface to access information stored in an inventory data store, wherein the inventory data store comprises data from the plurality of system hardware reports.

* * * * *